United States Patent [19]
Piszkin

[11] Patent Number: 5,474,317
[45] Date of Patent: Dec. 12, 1995

[54] ADJUSTABLE CANTILEVER-SEAT BIKE-FRAME

[76] Inventor: Thomas M. Piszkin, 1515 B Gustavo St., El Cajon, Calif. 92019

[21] Appl. No.: 124,863

[22] Filed: Sep. 21, 1993

[51] Int. Cl.⁶ ............................................. B62J 1/02
[52] U.S. Cl. ........................................ 280/283; 297/196
[58] Field of Search .................................. 280/283, 275, 280/281.1, 274, 288.4; 297/195.1, 196, 204, 205

[56] References Cited

U.S. PATENT DOCUMENTS

| | | | |
|---|---|---|---|
| 635,709 | 10/1899 | Andrew | 280/283 |
| 1,205,828 | 11/1916 | Whaley | 297/196 X |
| 1,416,942 | 5/1922 | Brooks | 297/196 |
| 1,469,136 | 9/1923 | Ziska, Jr. | 297/196 |
| 2,497,121 | 2/1950 | Fletcher | 280/283 X |
| 4,900,048 | 2/1990 | Derujinsky | 280/281.1 |
| 4,934,724 | 6/1990 | Allsop et al. | 280/283 X |
| 5,029,888 | 7/1991 | Allsop et al. | 280/275 X |
| 5,308,030 | 5/1994 | Bales | 280/283 X |

FOREIGN PATENT DOCUMENTS

| | | | |
|---|---|---|---|
| 958788 | 3/1950 | France | 280/283 |

OTHER PUBLICATIONS

Two pages of Magazine Advertisements by Allsop Co.
Two Pages of Magazine Advertisements by Zipp Co.
One Page Showing T. M. Piszkin's Racing-Bike by Our-Study.

*Primary Examiner*—Kevin T. Hurley

[57] ABSTRACT

An improved cantilevered-beam seat particularly suitable for a tubular-metal bike-frame, wherein the essential generic TitanFlex™ embodiment includes four generic variances. The first embodiment comprising a titanium-frame, having an integrally-formed cantilevered tubular-beam projecting aft from top of head-tube, which length and intermediate fulcrum-stanchion are tuned to deliver a fixed degree of deflection for an average rider whose seat is adjustable fore/aft thereto. The second version embodies the same structure, wherein is provided a special concealed carbon-fiber dampener-tube having a finely tapered trailing-end, fitted within the titanium beam; -lending a suitable amount of resonate-dampening to the natural cantilevered-beam springiness. The third version adding a special ASAP(adjustable shock-absorption platform) DialRide™ device; enabling rider to advantageously fine-tune the longitudinal spring-rate position of the previously mentioned internal dampener-tube, -on-the-fly. A forth version embodying the latter mentioned system, with added advantage of a frontal pivot-anchor for the titanium cantilevered-beam in combination with inter-swinging slip-fit stanchion-tubes, -enabling seat-height adjustment to cyclist's leg-length, also permitting entire main-frame to be made of much less costly cromoly-steel.

1 Claim, 1 Drawing Sheet

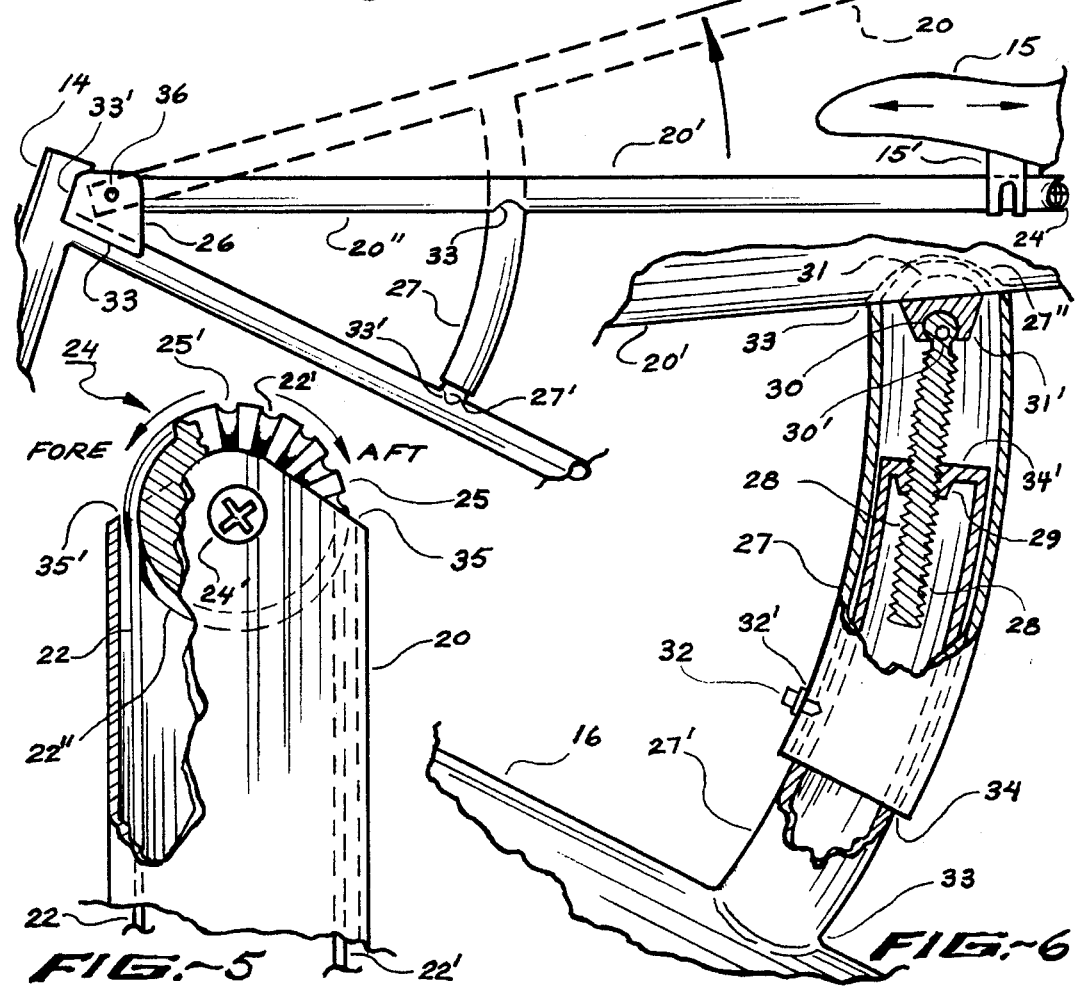

ADJUSTABLE CANTILEVER-SEAT BIKE-FRAME

I.) PROBLEMATICAL BACKGROUND OF RELEVANT EARLIER INVENTION

This invention relates to bicycle-frames, and more specifically it relates to tubular-metal types of bike frames having non-articulated shock & vibration seat supporting structure built-in to the frame.

Heretofore, it common knowledge that tubular bike-frame construction without benefit of articulated front or rear suspension, can impose considerable punishment unto the rider, particularly directed to the rider's pelvic-coccyx region; as well as imposing possible roadability dificulties. This problem has been ameliorated to some extent via pneumatic balloon-tires, and to a greater extent via independent wheel suspension systems; -but owing to weight restrictions and rolling-friction factors, these advancements have been relegated to use primarily among bicycles of the mountain-bike classification, where severe pounding off-road conditions necessarily dictate provision of both.

Background research discovery provides a particularly germane prior patent art regarded as material to this disclosure, in that U.S. Pat. No. 4,934,724 (filed: April, 1989, to Allsop Bike-Co.), contemplates several variations on a "combination beam seat support" of composite-plastic solid foam-core construction; including employment of an elastomeric material at both the forward nose anchor point and the mid-length point of longitudinal mounting to the bicycle frame. Additionally, the inventor clearly points out how each of the different generic-variant embodiments employs a sheer-gap provision, whereby the elastomeric substance bonds the upper and lower halfs together in a manner believed facilitating increased vertical bending of the seat beam; so that the rider, poised upon the saddle located at the extreme aftward end of the cantilevered beam, enjoys a substantially improved quality of ride, -owing to the shock-absorption ability of the aggregate structure.

The Allsop Beam-seat, and more recently, the Zipp-2001 (with monocoque carbonfiber-frame having a fully integrated aftwardly cantilevered seat-support) while offering good performance, are obviously predicated upon the premise that only carbonfiber composite-plastic construction can achieve such an extraordinary cantilevering strength characteristics, within the constraints of weight generally imposed upon high performance bicycle construction. There thus still remains however, need for an alternate type of light weight cantilevered beam-seat apparatus employing novel hollow tubular construction, heretofore eluding bicycle fabricators internationally.

Accordingly, the instant inventor hereof has developed an all titanium racing-bicycle employing an improved cantilevered-seat configuration employing tesil-stress rather than compression-stress in bending; along with a special abreviated frame rolling on 700 cm-wheels with an overall weight of only 16.8 lbs. This bike has already won significant race competitions on weekends, while providing reliable commuting service during weekdays; and, is currently in initial production as the TitanFlex™, under the auspices of the AiroSeries-Mfg/Mkt. Co., SanDiego, Calif.

II.) SUMMARY OF THE INVENTION

A.) In view of the foregoing discussion about the earlier invention art, it is therefore important to make it pellucid to others interested in the art that an object of this invention is to provide a light weight two-wheeled conveyance such as a bicycle, having a special longitudinal rigid frame arranged principally between the front and rear wheel axles, wherein is featured a longitudinally aftwardly projecting cantilevered seat support having both a forward mounting point and a mid-length stanchion-post. The forward mounting point (hereinafter referred to as the "anchor joint") for the seat-support is proximal to the head-tube(hereinafter referred to more descriptively as the "steering-mast"), while the provisional bike frame includes at least one longitudinally rigid structural uniting member extending aftwardly from the steering-mast to the rear-axle; said uniting member being preferably of tubular-metal construction, and also providing a means of support for the lower end of the previously mentioned stanchion-post. While a tubular metal bike framework is preferred in support of the above contemplated cantilevered seat-support portion, the special cantilevered configuration may be employed in combination with a bike frame fabricated from Kevlar® arimid-fiber, carbon-fiber, or a quasi-metal matrix such as boron-carbide ceramic; including the cantilevered seat-support portion.

B.) A further object of this invention is to provide a well integrated cantilevered seat support in the form of a tubular-beam preferably made from titanium-metal of preferably circular cross-section, preferably having an approximate 1¼-inch outside-diameter, and approximate ¹⁄₃₂-inch wall-thickness guage. If the bike frame is also made from titanium, then in custom-made versions particularly(where adjustability is not a vital requisite), the tubular-beam may be joined permanently via rig-welded inert argon-gas to the steering-mast; or alternately, to the uppermost longitudinal frame tube extending aftwardly therefrom. The bike frame and saddle aftwardly affixed to the tubular-beam may be configured for virtually any sort of cycling application, -ranging from track-racing, to touring, to mountain-biking; however, the cost of this innovative if hi-tech tubular-beam seat-support configuration is a factor presently limiting it's selection only by the more sophisticated cyclist.

C.) Another object of this invention is to provide a longitudinally cantilevered tubular-beam seat-support member, preferably made of tubular titanium-metal; wherein is optionally included as the frontal-most anchoring-joint provision, a trunnion like attachment bracket, wherein is provided a transverse mooring-pin arranged to pass through both the forward-most end of the tubular-beam and the trunnion sides. This non-solid joint arrangement not only enables the hi-strength/light-weight cantilevered seat support to be adjusted as to vertical height to accomodate a wide range of riders having different leg lengths, but facilitates easy adaptation of a therefore more readily standardized tubular-beam seat-support to other types of otherwise identically configured and attractive metal bike-mainframes, -as may be specially fabricated from chromoly, or aluminum for example; or, adaptation to other non-metal bike mainframes, as was previously mentioned.

D.) A still further object of this invention is to provide the invention embodiment according to paragraph-C, wherein is included a special adjustable stanchion-post comprising two inner-sleeved portions; an upper/outer-portion being rigidly formed integrally proximally to the mid-length of the tubular-beam portion, the lower/inner-portion being rigidly formed integrally therebelow to the frame's uppermost longitudinal structural member uniting the steering-mast to the rear-axle. Associated with this inner-sliding stanchion-post arrangement then, is an internal screw-jack like provision, arranged concentrically atop the inner-sleeve member portion; whereby the swing-arm like cantilevered seat support beam becomes raised when the coarse-threaded (for fast action, secured via a lock-nut) screw-jack male portion is extended by rotating it in the female-threaded fixed portion. Conversely, the elevation adjustment is lowered when the screw-jack male-portion is threadedly retracted downward into the inner-sleeve member.

E.) A final provision of this cantilevered seat support invention, resides in a feature referred to as "ASAP", an acronym for "Adjustable Shock-absorption Platform"; a refinement enabling a cyclist upon a bicycle so equipped, to virtually regulate the ride comfort-index, that is to say the compliance bending modulas (of elasticity) of the tubular-beam, -on the fly so to speak! While titanium tubing exhibits generally superior mechanical properties, such as high stiffness-to-weight ratio, no need for painting for protection from the elements, and resistance to flexural-fatigue; there remains a further need for a cantilevered seat support which can be custom tuned to a rider's preference, as to stiffness. This is uniquely achieved in the tubular-beam cantilevered seat-support configuration, via the additional provision of a concealed spring-rate frequency dampener insert shaft, a compliance tuning dampener-tube (preferably made from a simple 10-inch length of carbon-graphite tubing) which is slid forward into the tubular-beam to a station point proximally over the external stanchion-post. When the compliance/tuning-tube is positioned well forward of the stanchion-post(fulcrum point), the cantilevered-beam seat-support is given to it's maximum degree of vertical-compliance; yet, as the dampener-tube is drawn aftward to a station point approximately centered over the stanchion-post, the cantilevered-beam is instantly rendered considerably more stiff as to vertical-compliance. While this device may be optionally inserted at the factory, frictionally fixed in position to suit a given cyclist's weight, for the life of the product; an adjustable arrangement, whereby the compliance/tuning-tube may be readjusted from time-to-time is generally much more preferable, -with no weight penalty.

For example, during the onset of a race or in anticipation of long high-speed runs on a smooth level roadway, -one may prefer a less compliant seat support quality; -while as fatigue sets-in, or on a rough varied roadway, -one may prefer a highly compliant seat-support beam quality. This is readily attained through regulation of the ASAP/comfort-index via simple manual rotation of the DialRide™-control, a ball like palm-roller actuator stationed into the rearmost tubular-end of the cantilevered seat-support beam, immediately behind the saddle. This roller-knob is preferably located there on a vertical-pin axis, whereby finger or palm action rotation to the left facilitates an increase in the cantilevered beam stiffness; likewise rotation to the right, gives a decrease in cantilevered beam stiffness modulas; -employing an overall dampener-tube travel of about 6-inches.

The human-engineering factor involved in accessing this ball hand-roller member, is merely a quick and simple lateral reach motion around to the rear of the under-seat region, and the ball surface may be vertically-serrated to assure good tractability. The internally housed compliance/tuning-tube is therefore conveniently if expediently remotely coupled rearward to the accessible ball-roller regulator via a cord-loop member arranged therein said cantilevered hollow-tube, whereby the cord-loop passes intimately around the palm-roller aftwardly, entirely through the compliace/tuning-tube forward preferably around a convenient locator-axis such as the earlier mentioned frontal mooring-pin. Hence, with one course(preferably the right side course) of the cord-loop positively secured to the compliance/tuning-tube, actuation of the hand-roller obtains the desired degree of seating compliance.

Thus, while Allsop's labor intensive viscoelastic-substrate composite-laminate construction is eliminated in this new cantilevered seating embodiment, under a given seated-weight load-factor of 100-lbs., a maximum vertical-deflection of about 100-lbs./inch (2-inches/200-lbs. static-load) is accomodated at the saddle (center); and, with the Titan-Flex™-bike's ASAP DialRide™-control readjusted to a minimum vertical-deflection setting, only 100-lbs./¼-inch(½-inch/200-lbs. static-load); and, overall improved durability, -without bike weight increase!

III.) DESCRIPTION OF THE PREFERRED EMBODIMENT DRAWINGS

The foregoing and still other objects of this invention will become fully apparent, along with various advantages and features of novelty residing in the present embodiments, from study of the following description of the variant generic species embodiments and study of the ensuing description of these embodiments. Wherein indicia of reference are shown to match related matter stated in the text, as well as the Claims section annexed hereto; and accordingly, a better understanding of the invention and the variant uses is intended, by reference to the drawings, which are considered as primarily exemplary and not to be therefore construed as restrictive in nature.

FIG. 1, is a left side elevation-view showing the preferred overall appearance of the invention, replete with exemplified special mainframe configuration;

FIG. 2, is an enlarged detail view thereof, rotated clockwise slightly for layout purposes, showing a fixed cantilevered seat-support version of the invention, including phantom-outline reference to the optional variable compliance tuning provision;

FIG. 3, is a slightly further enlarged detail view thereof, shown in partial cutaway cross-section;

FIG. 4, is an alternate side-elevation view to that of FIG. 2, wherein a 2-position example more clearly reveals the articulated swing-beam arrangement suggested in FIG. 1;

FIG. 5, is an enlarged partial cut-away plan-view of the free distal end of the seat-support member, reveals the preferred arrangement of the ball-knob control device;

FIG. 6, is a greatly enlarged detail side-elevation partial cut-away view, revealing features within the stanchion-post in greater clarity.

IV.) ITEMIZED NOMENCLATURE REFERENCES:

10- the overall invention
11- ground reference-line
12/12'- front/rear wheels
13/13'- front/rear axles
14,14',14"- steering-mast, fork member, handlebar-stem
15,15',15"-conventional saddle, saddle-clamp, stub seat-tube
16,16'- frame mid-tube, frame down-tube
17,17'- frame pseudo/seat-tube, crank-bracket
18/18'- frame upper-left/lower-left chain-stay tubes
19- fixed stanchion-post
20,20'''-cantilevered top-tube seat support beam up/down, inner-portion
21,21'- cord-roller, roller-axis
22',22"- cord-loop right/left portions, second wrap of cord 23,23',23"-compliance tuning tube, tapered nose-end, square-end
24,24',24"- beam compliance control-knob, rotational-axis, retention-screw
25/25'- knurled lands/grooves
26- swing-beam anchor-bracket
27/27',27"-inter-sliding stanchion-post external-section/internal-section, upper-joint
28- male-threaded screw-jack shank
29- female-threaded fixed-boss
30,30'- ball-joint, saddle-pin
31,31'- U-shaped support-pad, pad-socket
32,32'- alien set-screw, threaded-boss
33/33'- welded-joints
34,34'- slip-fit gap, upper-terminus
35/35'- opposed chamfers
36- swing-beam pivot axis

V.) DETAILED DESCRIPTION OF THE PREFERRED EMBODIMENTS

Initial reference is given by way of FIG. 1, wherein is exhibited the presently preferred overall bicycle configuration 10 regarding the instant invention. Note that since the bike may be virtually of any sort, from an ultra-lightweight velodrome-track racing-bike, roadracing-bike (exemplified here), touring-bike, mountain-bike, motocross-bike, or even a powered-bike such as a moped, or motorcycle; the primary notion of novelty here essentially resides in the adaptation of the special cantilevered top-tube seat support beam 20, and it's stanchion-post 27, -relative to the mainframe. While the mainframe could be comprised of a single member such as the frame mid-tube 16 here uniting the steering-mast 14 with the rear-axle station 13', it is usually accompanied by a down-tube 16' spaced apart by a here pseudo seat-tube 17 joined in common to a pedal-bracket 17', along with four(two each side) smaller chain-stay tubes 18/18'. A variety of different types of specialized wheels 12/12' are available, shown with ground-plane reference-line 11; as is the case with the steering-fork 14', handlebar-stem 14", and rider-saddle 15; yet, there remain subtle, however critical differences which are to become herein more evident and understood as vital improvements.

While FIG. 1 exhibits the more preferred fully-adjustable embodiment of the invention, study of FIG. 2 reveals the more basic embodiment, that being a fixed cantilevered seat support beam 20, simply welded to the steering-mast 14, and additionally welded to the proximally mid-positioned(actually slightly forward of half-length is preferred) fixed stanchion-post 19; which arrangement represents the essential character of the invention. Also provided here is an abbreviated stub seat-tube 15" into which a conventional saddle seat-post may be installed; although the directly fitted saddle 15 and tube-clamp 15' arrangement shown elsewhere herein is rather preferred. However, since the much preferred material composition for the cantilevered-beam 20 is that of titanium-metal, this configuration necessitates the employment of titanium throughout the entire supporting mainframe structure as well; -which translates into a necessarily costly bicycle product, in as much as titanium is in of itself costly to procure. Notice that the entire fabricated structure is tig-welded, and performs like a cycling-racer's dream, relative to weight, stiffness, and reliability.

Additionally featured in FIG. 2 is an optional generic-variant provision referred to as ASAP™, and involves a compliance tuning tube 23, which is also shown in FIG. 3 in it's basic essential form, in as much as it is intended that it be inserted in place proximally above the fulcrum-like stanchion-post 19, where the exact preferred fore(F) or aft(A) is determined for a particular cyclist-rider. Since locating the tuning tube 23 so that it's trailing-end is forward of the rigid stanchion-post, leaves the cantilevered beam in it's ultimately highest state of compliance yield; then shifting the tuning tube aftward in trial increments thereby acts to dampen the spring-rate deflection property of the top tube 20, virtually tuning the beam into a progressively stiffer state of compliance yield. Note that the tuning tube is preferably made from production thin-wall carbonfiber-tubing, simply saw-cut at it's forward end 23", but preferably carefully shaped to a slight taper over the aftward approximate 3-inches of it's approximate 6-inch overall length. This preferred tapering section serves to aid in lending a more refined quality to the tuning procedure, since the dampener-tube end 23' is not thereby imposing a concentrated bend stress-point in the wall structure of the unsupported outer beam portion of the top-tube 20. While the tuning-tube 23 is preferably made tubular in cross-section, it is understood that a solid bar preferably circular in cross-section can be employed in equivalent manner. Additionally, in product versions not employing the adjustment ball knob 24, the inventor simply refers to the internally sliding tuning-tube device 23 as the SlideRide™ compliance adjustment system.

A further refinement of the friction-fitted tuning-device is shown in FIGS. 3, 4 and 5, wherein is provided a means by which a similar albeit slip-fitting, tuning tube 23 may be readily repositioned in a instant convenient manner, obviating need: of a reach-in repositioning tool of any sort. This variant embodiment referred to as DialRide™, prefers to employ a simple and light-weight arrangement of elements, comprising ball like control-knob 24, and assembly retention-pin 24"; whereby manual finger or hand-palm rotation acts to wind the braided-nylon cord-loop 22 fore or aft, and hence the dampener-tube 23 likewise as well, since one lateral course of the cord 22 is secured upon the dampener-tube 23 while the remaining course 22' merely passes through the hollow passage of the tuning tube. For best results, it has been found that a second wrap 22" of the cording about the rotary knob 24 medial-groove serves to provide a reliable non-slip action; while the extreme opposite forward end of the cord-loop is preferably routed around a pully like nylon cord-roller 21 freely rotating upon roller-axis 21', or the swing-beam pivot-axis 36 may be likewise utilized instead of pin 21'. To further enhance the DialRide™ operation convenience, vertical knurling lands 25 and grooves 25' should be included, along with a preferred 30-degree lateral chamfer 35/35' and general smoothing to the preferred 1¼-inch diameter tube terminus, so as to improve accessibility of the approximate 1-inch diameter blue-plastic control-knob.

Finally, reference to FIGS. 4 and 6 also reveals the SwingBeam™ feature, which offers some great advantages over the fixed embodiment version of FIG. 2. Firstly, being rigidly anchored at the special trunnion-like anchor-bracket 26, there is no appreciable loss of lateral frame stiffness integrity, or torsional-rigidity; in no small factor owing to the lower internal-section 27' of the distally located stanchion-post being rigidly welded 33 to the mid-tube 16. FIG. 2 displays how clean the inner-sliding stanchion-post version normally appears, while the cutaway of FIG. 6 reveals the preferred internal members thereto. To readjust the saddle 15 height up/down for different riders, one need merely release the optional pointed-end allen/set-screw 32 (threaded into boss 32' and acting against the outside wall of the internal tube 27'), so as to thus swing the cantilevered beam 20 upward sufficiently as to access the thus exposed screw-jack member 28, which is coarse-threaded(for quicker readjustment) into a matching female-threaded boss 29 made into the upper terminus 34' of the lower stanchion portion 27'. Poised atop the screw-jack 28 is an integral ball 30 having some manner of positive non-turning indexing provision such as a locating saddle-pin 30', which indexes into a vertical-slot made into the molded-nylon U-shaped support-saddle 31, the lower portion of which also houses a female-socket receiving the ball portion 30. Hence, the support-saddle 31 remains a part of the screw-jack assembly 28, but raises up or down corresponding to the number of screw rotations made to the screw-jack; and, when height selection is determined, the swing-beam 20 is merely lowered back down so the the U-saddle 31 bears up directly beneath the small area of tubing-wall 20' formed within the upper-joint of the external-section of the stanchion-post 27. Generally, it has been found that a 3-inch overall travel of the screw-jack is ample for accomodating a wide range of different rider leg-lengths. Instead of the provisional set-screw 32, some prefer the substitution of a substantially conventional seat-post quick-release clamp arrangement, where weight is not as vital a factor as convenience; since the primary purpose of such provision is primarily to eliminate any presence of squeeking or inadvertant movement of the beam 20 when lifting the bike for example. Additionally, it should be noted that customary fore/aft readjustment of the saddle 15 is accomplished simply via loosening of the saddle-clamp 15' as observed in FIG. 4.

Thus, it is readily understood how the preferred and generic-variant embodiments of this invention contemplate performing functions in a novel way not heretofore available nor realized. It is implicit that the utility of the foregoing adaptations of this invention are not necessarily dependent upon any prevailing invention patent; and, while the present invention has been well described hereinbefore by way of certain illustrated embodiments, it is to be expected that various changes, alterations, rearrangements, and obvious modifications may be resorted to by those skilled in the art to which it relates, without substantially departing from the implied spirit and scope of the instant invention. Therefore, the invention has been disclosed herein by way of example, and not as imposed limitation, while the appended Claims set out the scope of the invention sought, and are to be construed as broadly as the terminology therein employed permits, reckoning that the invention verily comprehends every use of which it is suseptible. Accordingly, the embodiments of the invention in which an exclusive property or proprietary privilege is claimed, are defined as follows.

VI.) What is claimed of proprietary inventive origin is:

1. A special vertical compliance adjustment device in combination with a bicycle having a frame and a saddle of the type secured to a longitudinally disposed hollow tube cantilevered-beam extending aftwardly from a mooring point proximal to the bicycle frame's steering-mast, including an aftward stanchion support acting to fix the trailing elevation of said cantilevered-beam to said frame disposed there below; said saddle compliance adjustment device comprising:

an internal compliance tuning-tube member precisely slip-fitted inside said hollow tube so as to enable selective longitudinal repositioning within said hollow tube proximally above said externally disposed stanchion's effective fulcrum-point, whereby sliding of said tuning-tube aftwardly reduces compliance yield of said beam, while forwardly sliding said tuning tube conversely increases compliance yield of said cantilever-beam.

\* \* \* \* \*